US008731972B1

(12) United States Patent
Wolf et al.

(10) Patent No.: US 8,731,972 B1
(45) Date of Patent: May 20, 2014

(54) METHOD AND SYSTEM FOR MARKET PERFORMANCE ANALYSIS

(75) Inventors: Brandon Lewis Wolf, Helotes, TX (US); Brooke Schneider Spencer, San Antonio, TX (US); Randy Paul Burris, San Antonio, TX (US); Teresa Marian Haynes, San Antonio, TX (US); Natalia Evgenyevna Dunaeva, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 726 days.

(21) Appl. No.: 11/849,684

(22) Filed: Sep. 4, 2007

(51) Int. Cl.
*G06Q 40/00* (2012.01)
*G06Q 30/02* (2012.01)
*G06Q 10/10* (2012.01)
*G06F 7/00* (2006.01)

(52) U.S. Cl.
CPC ............... *G06Q 40/00* (2013.01); *G06Q 30/02* (2013.01); *G06Q 10/10* (2013.01); *G06F 7/00* (2013.01); *G06Q 30/0271* (2013.01)
USPC .................. 705/4; 705/36 R; 705/35; 705/38; 705/37; 705/1.1

(58) Field of Classification Search
CPC ..................................................... G06Q 40/00
USPC ................ 705/1, 4, 1.1, 36 R, 35, 10, 38, 37; 707/102, 9, 10, 2; 726/28
See application file for complete search history.

(56) References Cited

U.S. PATENT DOCUMENTS 7,228,298 B1 * 6/2007 Raines ................................. 1/1

OTHER PUBLICATIONS

Cognos. "Insurance Product Profitability." Cognos Incorporated, [retrieved from the Internet on Jan. 17, 2008 using <URL: http://www.cognos.com/pdfs/blueprints/bp_byg_fs_product_performance_omsiramce/pdf>].*
IBM. "Industry Models for Insurance: Insurance Information Warehouse (IIW) Overview." IBM, [retrieved from the Internet on Jan. 17, 2008 using http:l/www-O3.ibm.comlindustrieslfinancialservices/doc/content/binl fss_IIW GIM June2006.pdf?g_type=rhc>].*
Cognos News Release. "Cognos Partners With Suncorp to Develop Performance Solution to Help Insurance Companies Optimize Product Profitability." Cognos Incorporated, Mar. 26, 2007, [retrieved from the Internet on Jan. 17, 2008 using <URL: http://www.cognos.com/news/releases/2007/0326.html>].

(Continued)

*Primary Examiner* — John H Holly
(74) *Attorney, Agent, or Firm* — Baker & Hostetler LLP

(57) ABSTRACT

Methods and systems are disclosed for allowing a user to quickly and easily generate market performance analysis reports. The methods and systems use data mart and on-line analytical processing (OLAP) technology to provide users with summary and detailed information without requiring the user to have specific programming skills. In one implementation, the methods and systems may provide a data mart optimized for the auto insurance industry. Such a data mart may contain data pertaining to auto insurance policies, vehicles, operators, coverage, and incident. Data cubes may be used to organize the data in the data mart according to one or more dimensions. Corresponding perspectives may be constructed to allow the user to access the data in the data cubes. Report templates provide a starting point from which the user may modify for dynamic data exploration or dive deeper into the data "on the fly."

21 Claims, 9 Drawing Sheets

(56) References Cited

OTHER PUBLICATIONS

Cognos. "Insurance Product Profitability." Cognos Incorporated, [retrieved from the Internet on Jan. 17, 2008 using <URL: http://www.cognos.com/pdfs/blueprints/bp_bvg_fs_product_performance_insurance.pdf>].

IBM. "Industry Models for Insurance: Insurance Information Warehouse (IIW) Overview." IBM, [retrieved from the Internet on Jan. 17, 2008 using <URL: http://www-03.ibm.com/industries/financialservices/doc/content/bin/fss_IIW_GIM_June2006.pdf?g_type=rhc>].

MarketStance News Release. "MarketStance Launches "ExpressReports" Service for Property/Casualty Insurance Market." MarketStance, [retrieved from the Internet on Jan. 17, 2008 using <URL: http://www.marketstance.com/whatsnew_20050810.html>].

* cited by examiner

METHOD AND SYSTEM FOR MARKET PERFORMANCE ANALYSIS

CROSS-REFERENCE TO RELATED APPLICATIONS

This application is related in subject matter to, and incorporates herein by reference in its entirety, each of the following: U.S. patent application entitled "Method and System for Market Performance Analysis," bearing Ser. No. 11/849,676 (Applicant Reference No. US-0238.01), filed on the same date as this application; U.S. patent application entitled "Method and System for Market Performance Analysis," bearing Ser. No. 11/849,679 (Applicant Reference No. US-0238.02), also filed on the same date as this application; U.S. patent application Ser. No. 11/367,208 (Applicant Reference No. US-0069.01), entitled "System for Market and Financial Performance Analysis," filed Mar. 3, 2006; U.S. patent application Ser. No. 11/367,209 (Applicant Reference No. US-0069.02), entitled "System for Market and Financial Performance Analysis," filed Mar. 3, 2006; and U.S. patent application Ser. No. 11/367,210 (Applicant Reference No. US-0069.03), entitled "System for Market and Financial Performance Analysis," also filed Mar. 3, 2006.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The disclosed embodiments relate generally to market performance analysis and, more specifically, to systems and methods therefor.

BACKGROUND

Companies require both summary and detailed market performance data in order to make correct decisions on the design and pricing of products for potential customers and existing customers. This is particularly the case for companies that provide financial products, such as insurance products. Although a number of standard marketing analysis reports are typically available, these canned reports are of little value to a user seeking specific business intelligence. To get this information, the user usually must submit an ad-hoc request to an information technology (IT) professional at the company who has programming skills, familiarity with the various databases, and specific knowledge of the business. The IT professional then conducts a number of time-consuming searches across several databases in order to generate the specific market performance analysis report for the user.

Because the databases tend to be unconnected, each database often being in a different file format, market performance analysis reports generated in the above manner typically take a long time to complete. In addition, the reports often yield large volumes of very detailed data, making them difficult to review and analyze. And because the databases are usually unconnected, the data contained in the reports tends to be poorly integrated, which often raise additional market performance questions that require the user to submit one or more additional ad-hoc data requests in order to address the additional questions.

By way of an example, if a user has an interest in introducing a new auto insurance product designed for young potential customers of a new risk group, the user would need to submit multiple requests, each request directed to information from a specific data source, in order to obtain a good overview of this potential market category. The requested data may include, for example, past cancellation counts for young policy holders from a "Marketing Department Cancellation" file, sales close rates for young potential customers from a "Marketing Department Quotes & Issues" file, and in-force counts on young policy holders from an "Active In-Force Department" file. In order to narrow the pool of young potential customers to those with acceptable insurance risk characteristics, the retrieved data is merged with data on insurance risk on young potential customers (obtained typically from a separate fourth data source).

Accordingly, what is needed is a more efficient way to generate market performance analysis reports. More specifically, what is needed is a way for the user to quickly and easily generate market performance analysis reports that may contain summary and/or detailed data on virtually any aspect being tracked and measured for a given product.

SUMMARY

The disclosed embodiments are directed to methods and systems for allowing a user to quickly and easily generate market performance analysis reports. The methods and systems use data mart and on-line analytical processing (OLAP) technology to provide users with summary and detailed information without requiring the user to have specific programming skills. In one implementation, the methods and systems may provide a data mart optimized for the auto insurance industry. Such a data mart may contain data pertaining to auto insurance policies, vehicles, operators, coverage, and incident. Data cubes may be used to organize the data in the data mart according to one or more dimensions. Corresponding perspectives may be constructed to allow the user to access the data in the data cubes. Report templates provide a starting point from which the user may modify for dynamic data exploration or dive deeper into the data "on the fly."

BRIEF DESCRIPTION OF THE DRAWINGS

The foregoing and other advantages of the invention will become apparent from the following detailed description and upon reference to the drawings, wherein.

DETAILED DESCRIPTION

Figure 1:
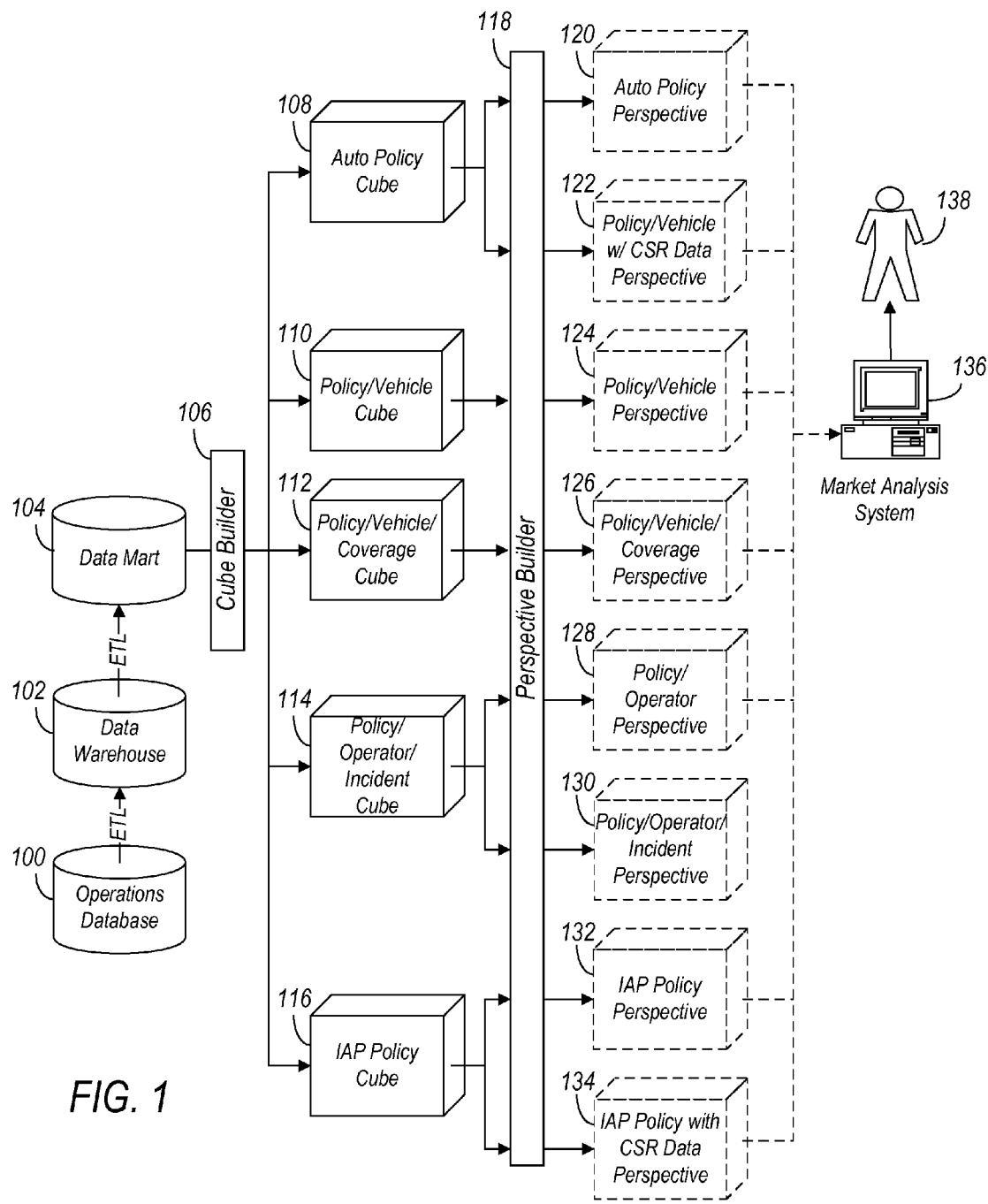
FIG. 1 illustrates an exemplary infrastructure for providing market performance analysis reports according to the disclosed embodiments.

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial embodiment of the inventions are described or shown for the sake of clarity and understanding.

Persons of skill in this art will also appreciate that the development of an actual commercial embodiment incorporating aspects of the inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the embodiments disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims.

Particular embodiments are now described with reference to block diagrams and/or operational illustrations of methods. It should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system.

The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

As mentioned above, the disclosed embodiments are directed to methods and systems for allowing a user to quickly and easily generate market performance analysis. In general, a market performance analysis report is a report that provides measurements of competitive effectiveness for various segments of a business. The disclosed methods and systems use data mart and on-line analytical processing (OLAP) technology to provide users with summary and detailed information in a format that is easy for users to interpret and manipulate. The users may also change the information being viewed "on the fly" with a refresh time in minutes or seconds, depending on the complexity of the report and the particular system setup. New dimensions may be easily added to existing reports, filters applied on domain values (i.e., "select only ex-dependents with no adverse driving activity," etc.), and dimensions expanded as needed.

The particular methods and systems described herein are optimized for auto insurance, but those having ordinary skill in the art will understand that they are equally applicable to other industries. These methods and systems employ consistent business rules to define numerous data dimensions at multiple levels of the auto insurance business, including policy, coverage, operator, vehicle, incident, and other levels. Users may then view and analyze a multitude of business metrics and dimensions simultaneously and/or in combination. The user may view the data according to any combination of different segments, including by company, by state, by geographical territory within a state, by certain policy characteristics (e.g., bodily injury limits, etc.), by underwriting tier, by credit score, and so forth. Such data may come from a any number of combination of different sources within and external to the company.

In addition, the methods and systems are capable of integrating several different types of information into one reporting format. For example, users may view close rates, issue counts, quote counts, cancellation rates, cancellation counts, policy in-force counts, operator in-force counts, vehicle in-force counts, coverage counts, vehicle additions, vehicle deletions, operator additions, operator deletions, coverage counts, and corresponding premiums tracked over time in one report. This eliminates the need for users to reference multiple reports simultaneously. Users may also create new measures that relate these different types of information to each other. For example, having cancellation counts and policy in-force counts on the same report allows the user to examine a cancellation rate (e.g., number of cancellations per 10,000 vehicles) that puts the cancellation count into perspective. As another example, having policy and vehicle in-force counts on the same report allows the user to derive a vehicle per policy ratio and helps to understand the percent of multi-vehicle policies compared to single vehicle policies.

Referring now to FIG. 1, an exemplary OLAP infrastructure is shown for providing market performance analysis according to the disclosed embodiments. Although these embodiments are discussed with respect to auto insurance, those having ordinary skill in the art understand that the disclosed embodiments are equally applicable to other types of insurance, including annuities, homeowners, condominium owners, fire, health, high value personal property, income replacement, life, long term care, Medicare supplement, renters, student health, watercraft and the like. Likewise, those having ordinary skill in the art understand that the concepts and teaching herein may be employed to generate market performance analysis for other kind of products, including banking products, credit card products, investment products, and the like.

As can be seen in FIG. 1, the exemplary OLAP infrastructure includes an operations database 100, a data warehouse 102, and at least one data mart 104, all interconnected as shown. Extract-Transform-Load (ETL) software, such as those commercially available from Informatica Corp. of Redwood City, Calif., may then be used to extract, transform, and load the data from the operations database 100 to the data warehouse 102, and from the data warehouse 102 to the data mart 104, on a periodic basis (e.g., weekly, monthly, etc.) and/or as needed. The operations database 100, data warehouse 102, and data mart 104 are data storage structures that are well known to those having ordinary skill in the art and are therefore only a brief description is given below.

In general, the operations database 100 provides real-time storage for all data tracked and stored by a company as the data becomes available. In the example discussed herein, such data may include data on the number of new insurance policies, the number of policies canceled, the number of claims made, and the like. Because such data is constantly being received by and stored in the operations database 100 as part of the normal operation of the company, the operations database 100 needs to remain as unencumbered as possible in order to keep up with the flow of data. As a result, the operations database 100 is usually not available to be queried so as to avoid impacting the performance of the operations database 100. Instead, a copy or snapshot of the data in the operations database 100, or a subset thereof, is normally placed in the data warehouse 102.

The data warehouse 102 is in essence a staging data store. Its main function is to support various queries and requests for business intelligence and market performance analysis reports. The same data warehouse 102 may be used either for a particular line of business or for all lines of business, depending on the size of the company. Such a data warehouse 102 is normally subject-oriented (i.e., they link together data elements relating to the same event), time-variant (i.e., they store historical data as well as current data), and non-volatile (i.e., they do not overwrite or delete data). The data warehouse 102 is also expected to be able to integrate data from a range of different data sources, such as mainframe computers, server computers, and personal computers, as well as office automation software, such as spreadsheets, word processors, and the like.

Because the data warehouse 102 typically stores both current and historical data, and because the stored data is highly granular, the size of the data warehouse 102 may render it inefficient for more complex queries and searches of the type needed to make highly accurate projections and decisions with respect to the design and pricing of new and/or existing products. As such, most OLAP infrastructures further organize the data in the data warehouse 102 into data marts 104, usually one data mart 104 for each line of business. Thus, auto insurance may have one data mart 104, credit cards may have another, banking yet another, and so on. Like the data warehouse 102, the data marts 104 may contain a copy of some or all of the company's operational data, but each data mart 104 is arranged according to a specific grouping or configuration that addresses the needs of its particular line of business. In this sense, the data mart 104 may be considered to be a customized or specialized version of the data warehouse 102. The data marts 104 may then be used by the lines of businesses to make product decisions and formulate strategies based on analyses of past trends and performances.

Figure 2:
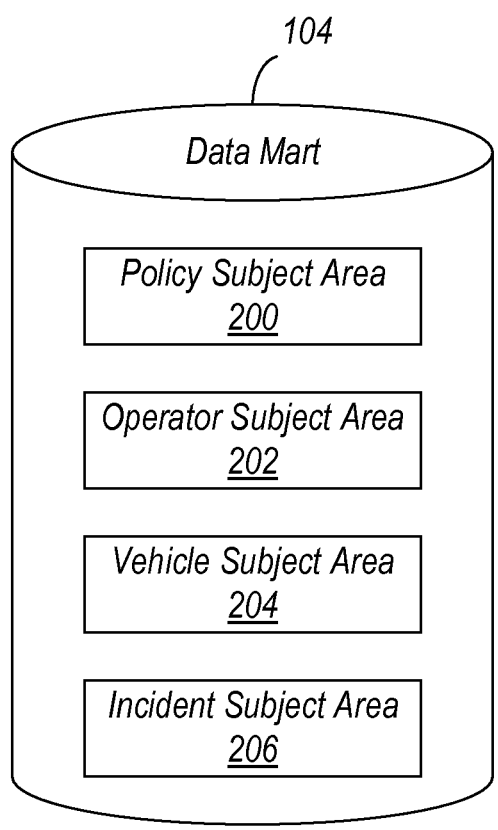
FIG. 2 illustrates an exemplary data mart for providing market performance analysis reports according to the disclosed embodiments.

Moving briefly to FIG. 2, an exemplary data mart 104 for an auto insurance line of business according to the disclosed embodiments may be seen. The term "auto insurance" is used herein to refer to insurance coverage for cars, trucks, motorcycles, and other vehicles of transportation. There are typically five types of auto insurance coverage: bodily injury and property damage, personal injury protection, uninsured and underinsured motorists, collision, and comprehensive. Each coverage commonly has a maximum coverage limit as well as a minimum coverage limit that is required by each state. In addition to the types of coverage and coverage limits, other variables for auto insurance may include credit scores, deductibles, number of times renewed, safe driver insurance points, driver training, age or years of driving experience, vehicle usage, and premium payment period (e.g., monthly, quarterly or annually).

Based on the foregoing definition, the data contained in the data mart 104 may be generally divided into the following subject areas: a policy subject area 200, an operator subject area 202, a vehicle subject area 204, and an incident subject area 206. As the name implies, the policy subject area 200 may contain data pertaining to the auto insurance policies, such the number of quotes issued, policies in force, policies canceled, and so on. The operator subject area 202 may contain data pertaining to the operators insured by the above policies, including age, gender, whether or not they are the primary drivers, and the like. The vehicle subject area 204 may contain data pertaining to the vehicles insured by the above policies, including year, make, model, and the like. Finally, the incident subject area 206 may contain data pertaining to the incidents that have occurred on each policy, such as wrecks, thefts, traffic violations, and the like. Of course, other subject areas not shown here may be added to the data mart 104, or one of the listed subject areas 200-206 may be removed from the data mart 104, without departing from the scope of the disclosed embodiments.

Figure 3:
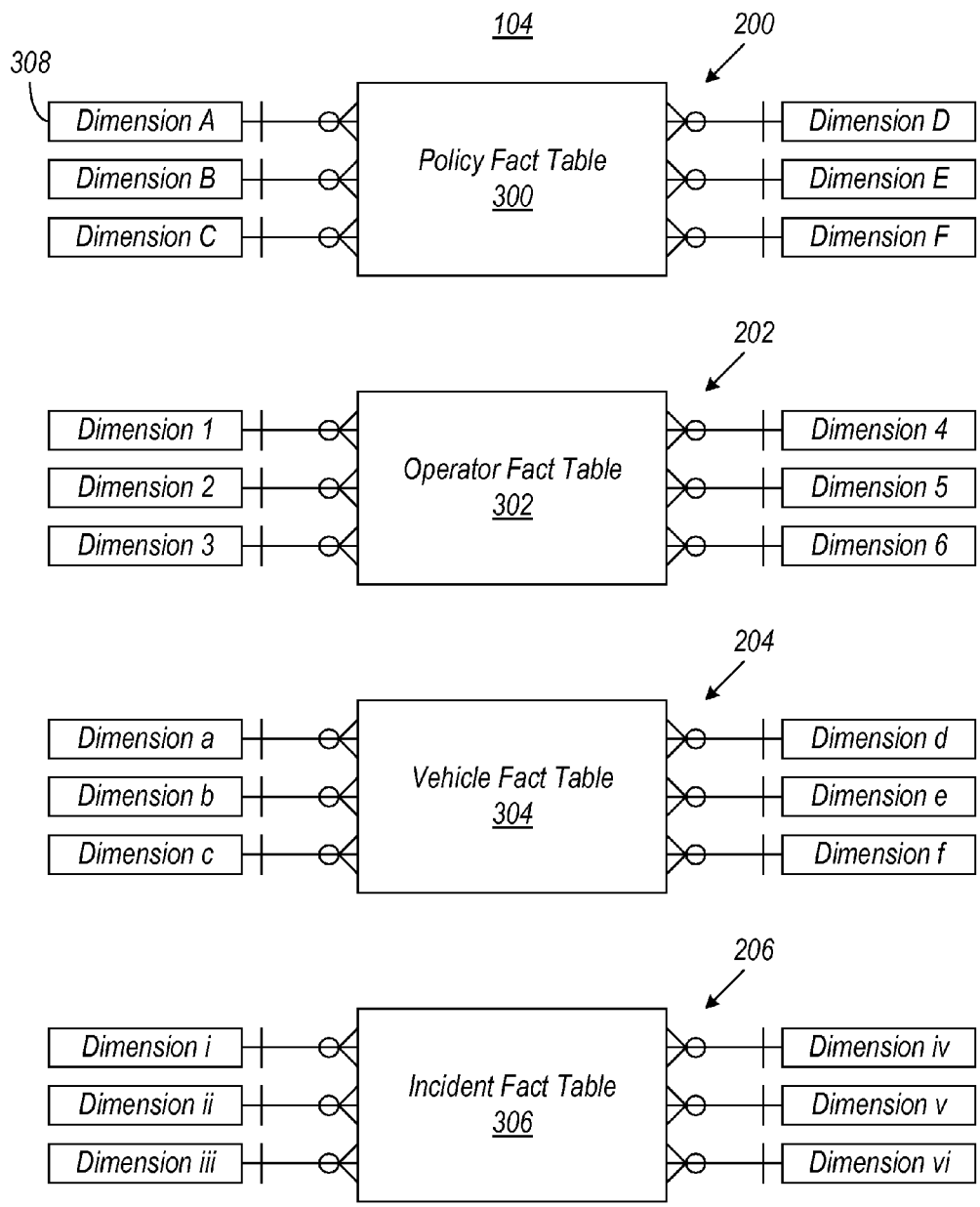
FIG. 3 illustrates the exemplary data mart of FIG. 3 in more detail according to the disclosed embodiments.

FIG. 3 illustrates these various subject areas in more detail. As can be seen, each of the subject areas 200-206 may be composed of a corresponding fact table, including a policy fact table 300, an operator fact table 302, a vehicle fact table 304, and an incident fact table 306. The fact tables 300-306 may store data pertaining to the various metrics and measures that are tracked for the given subject area. For example, the policy fact table 300 may store data pertaining to the number of quotes issued, policies in force, policies canceled, and so on. Likewise for the operator fact table 302, the vehicle fact table 304, and the incident fact table 306.

Each fact table 300-306 in turn may be connected to a plurality of dimension tables, one of which is indicated at 308. By way of background, a dimension in OLAP is essentially a way of viewing or analyzing data according to a particular attribute or characteristic of the data. Common dimensions that may be applied to many transactions may include, for example, name, date, amount, location, and the like. Here, the dimension tables 308 may store data pertaining to various aspects of auto insurance in the subject areas 200-206. For example, the dimension tables 308 may store data pertaining to the city, state, time period, and the like, for the insurance policies issued. Some subject areas 200-206 may have dimension tables 308 with overlapping data fields (not expressly shown), while other subject areas 200-206 may have dimension tables 308 with fields that are specific to that subject area only. As an example, the operator subject area 202 may be the only one with a dimension table 308 that contains data pertaining to the gender of the operator.

To connect the dimension tables 308 to the fact tables 300-306, one or more of the fields in each dimension table 308 and fact table 300-306 may be designated as key fields (not expressly shown). The key fields in the dimension tables 308 may then be linked to the key fields in the fact tables 300-306 via a special relationship. In the embodiments shown here, the key fields in the dimension tables 308 are linked to the key fields in the fact tables 300-306 by a one-to-many relationship, meaning that one key field in a dimension table 308 may be linked to several key fields in a fact table 300-306. Of course, those having ordinary skill in the art understand that other relationships may certainly be used without departing from the scope of the disclosed embodiments.

Referring back to FIG. 1, from the data mart 104, one or more data cubes may be constructed, as is consistent with OLAP infrastructures. These data cubes may be constructed using a cube builder application 106, such as Microsoft Analysis Service from Microsoft Corp. of Redmond, Wash. In OLAP, a data cube is a logical structure in which data is aggregated into arrays, each array containing data pertaining to one or more dimensions, in order to facilitate quick analysis. In this way, data cubes may be thought of as extensions of the conventional spreadsheet. Such data cubes allow a user to view data in a given dimension (e.g., product type, time period, location, revenue, cost, etc.), then quickly switch to another dimension. Thus, a key benefit of a data cube is that it can be quickly reoriented so that data may be displayed according to one or more desired dimensions. The aggregating of data by different dimensions in one data cube makes the data cube particularly well-suited for near instantaneous analysis of large amounts of data.

In accordance with the disclosed embodiments, a plurality of data cubes may be created in the OLAP infrastructure of FIG. 1, each data cube pertaining to one or more aspects of the auto insurance business. There may be, for example, a policy cube 108, a policy/vehicle cube 110, and a policy/coverage cube 112. Other data cubes that may be present may include a policy/operator/incident cube 114 and an improved auto pricing (IAP) policy cube 116. Of course, those having ordinary skill in the art understand that other data cubes besides the data cubes 108-116 shown here may be used without departing from the scope of the disclosed embodiments. Similarly, one or more of the data cubes 108-116 shown here may be eliminated without departing from the scope of the disclosed embodiments. And although distinct data cubes 108-116 are shown, one of more of these data cubes may contain data that overlaps data in one or more other data cubes 108-116.

In general, the policy data cube 108 contains data on the auto insurance policies themselves, arranged according to various dimensions. Such dimensions may include, for example, the number of policies issued in a given time period, in a certain region, and the like. In some embodiments, the policy data cube 108 may also contain CSR (Customer Service Representative) data identifying various CSRs, such as employee number. This data allows management to, among other things, track the performance of a CSR with respect to the data contained in the policy data cube 108 (e.g., number of policies issued, etc.).

The policy/vehicle data cube 110 may contain data on the vehicles covered by the policies in the policy cube 108 (hence the "/" in the cube label). The dimensions of the policy/vehicle cube 110 may include, for example, vehicle type, model year, vehicle description, and the like. The policy/vehicle data cube 110 and the data therein may stem from the policy data cube 108 in some cases, or it may be entirely independent of the policy data cube 108.

The policy/vehicle/coverage cube 112 may stem from the policy/vehicle cube 110 in some cases and may contain data on the different coverage (e.g., bodily injury and property damage, personal injury protection, uninsured and underinsured motorists, collision, and comprehensive, etc.) provided with the various policies. Examples of the dimensions of the policy/vehicle/coverage cube 112 may include coverage amount, coverage type, and the like.

The policy/operator/incident cube 114 cube may contain data on the operators covered by the various policies and any incidents the operators may have had. An incident may be, for example, an auto accident, theft, traffic violation, and the like. Examples of the dimensions for this cube may include the ages of the operators, number of incidents each operator may have had, the role of the operator on the policy (e.g., primary insured, dependent, etc.), and the like.

Finally, the IAP policy cube 116 may contain data pertaining to various customer characteristics used by the company to determine policy premiums. These additional characteristics may include, for example, new car discount, how deep the customer's relationship to the company is (i.e., what other company products the customer uses), length of tenure with the company's auto insurance, and the like. Like the policy data cube 108, in some embodiments, the IAP policy cube 116 may also contain data identifying various CSRs, such as employee number. This data allows management to, among other things, track the performance of a CSR with respect to the data contained in the IAP policy cube 116.

To view or browse the data in the cubes 108-116, a "perspective" or translation of the data needs to be created. Although they are not necessary (i.e., the data cubes 108-116 may be accessed directly), perspectives are designed to prevent users from selecting invalid or nonsensical combinations of dimensions and metrics. The perspective allows a user to define, for example, the particular metric to query, which dimensions to apply to the results of the query, how to display the results, and so forth. Such perspectives may be constructed using any suitable commercially available perspective builder 118, for example, Microsoft Excel from Microsoft Corp. of Redmond, Wash. Microsoft Excel and other spreadsheet applications are particularly useful for building perspectives because of their pivot table feature. As those having ordinary skill in the art understand, a pivot table is essentially a data summarization tool found in most spreadsheet programs that can, among other things, automatically sort, count, and total the data stored in the spreadsheet, then create a second table displaying the summarized data. The pivot table also allows the user to change the summary by dragging and dropping fields into the spreadsheet. Other perspective builders 118 with similar features that may be used include Tableau from Tableau Software, Inc. of Seattle, Wash.

In accordance with the disclosed embodiments, the perspectives that may be constructed may include, for example, a policy perspective 120 and a policy/vehicle with CSR data perspective 122 corresponding to the auto policy data cube 108, a policy/vehicle perspective 124 for the policy/vehicle cube 110, and a policy/vehicle/coverage perspective 126 for the policy/vehicle/coverage data cube 112. Also shown in FIG. 1 are a policy/operator perspective 128 and a policy/operator/incident perspective 130 corresponding to the policy/operator/incident data cube 116, and an IAP policy perspective 132 and an IAP policy with CSR data perspective 134 for the IAP policy cube 116. These perspectives may then be accessed by users with no specific programming experience to view and browse the data in the data cubes 108-116 as needed. Such an arrangement allows the users to generate various market performance analysis reports "on the fly" without the aid of an IT professional.

To generate the market performance analysis reports, a market analysis system 136 may be provided according to the disclosed embodiments. The market analysis system 136 may present a graphical user interface for the various perspectives 120-134. A user 138 may then use the graphical user interface to access one of the perspectives 120-134 instead of issuing command line instructions and the like. Once having accessed a particular perspective 120-134, the user 138 may select various dimensions with which to view the data from the data cube 108-116 corresponding to that perspective 120-134. The user 138 may thereafter run and rerun as needed one or more market performance analysis report from the data.

Figure 4:
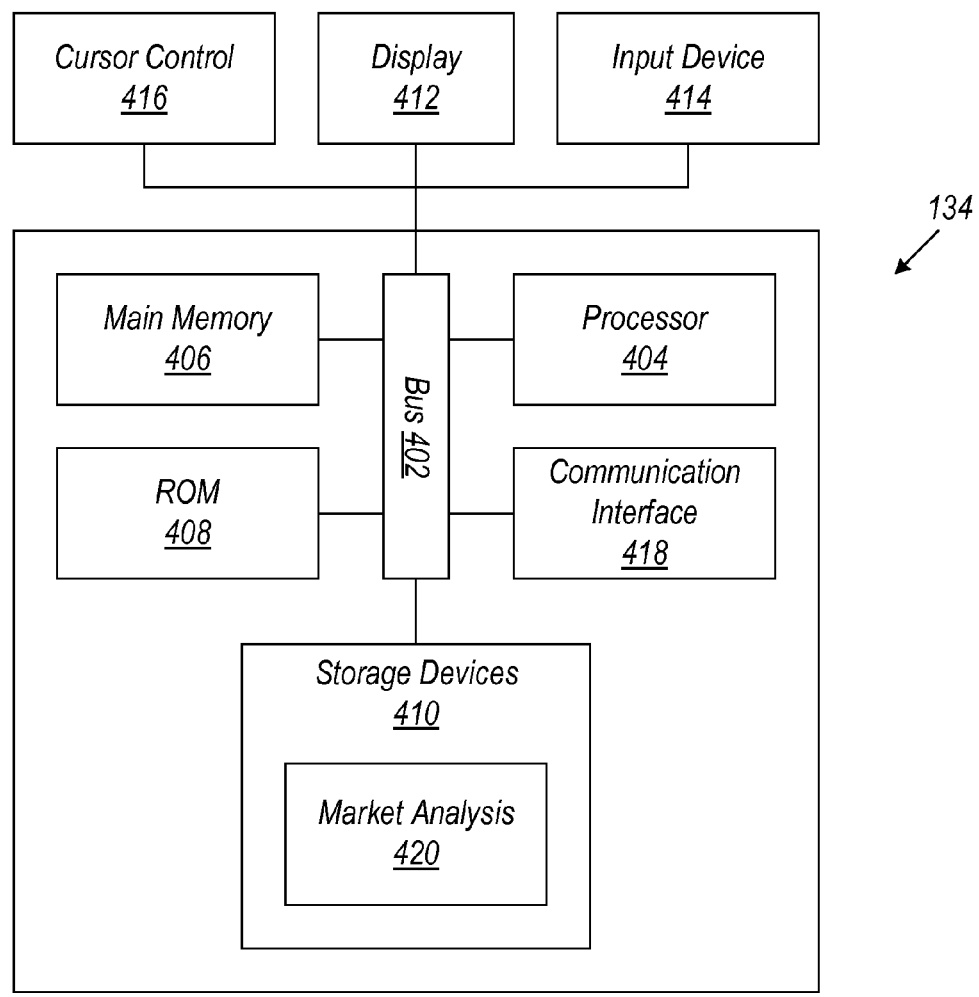
FIG. 4 illustrates an exemplary system capable of providing market performance analysis reports according to the disclosed embodiments.

FIG. 4 illustrates the market analysis system 136 in more detail according to the disclosed embodiments. Any suitable computer system known to those having ordinary skill in the art may be used as the market analysis system 136, including a personal computer, workstation, server, mainframe, and the like. Such a market analysis system 136 typically comprises a bus 402 or other communication mechanism for communicating information, and a processor 404 coupled with the bus 402 for processing the information. The market analysis system 136 may also include a main memory 406, such as a random access memory (RAM) or other dynamic storage device, coupled to the bus 402 for storing computer-readable instructions to be executed by the processor 404. The main memory 406 may also be used for storing temporary variables or other intermediate information during execution of the instructions to be executed by the processor 404. The market analysis system 136 may further include a read-only memory (ROM) 408 or other static storage device coupled to the bus 402 for storing static information and instructions for the processor 404. A computer-readable storage device 410, such as a magnetic, optical, or solid state device, may be coupled to the bus 402 for storing information and instructions for the processor 404.

The processor 404 may be coupled via the bus 402 to a display 412, such as a cathode ray tube (CRT) or liquid crystal display (LCD), for displaying information to a user. An input device 414, including, for example, alphanumeric and other keys, may be coupled to the bus 402 for communicating information and command selections to the processor 404. Another type of user input device may be a cursor control 416, such as a mouse, a trackball, or cursor direction keys for communicating direction information and command selections to the processor 404, and for controlling cursor movement on the display 412. The cursor control 416 typically has two degrees of freedom in two axes, a first axis (e.g., X axis) and a second axis (e.g., Y axis), that allow the device to specify positions in a plane.

The term "computer-readable instructions" as used above refers to any instructions that may be performed by the processor 404 and/or other components. Similarly, the term "computer-readable medium" refers to any storage medium that may be used to store the computer-readable instructions. Such a medium may take many forms, including, but not limited to, non volatile media, volatile media, and transmission media. Non-volatile media may include, for example, optical or magnetic disks, such as the storage device 410. Volatile media may include dynamic memory, such as main memory 406. Transmission media may include coaxial cables, copper wire and fiber optics, including wires of the bus 402. Transmission media may also take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer-readable media may be involved in carrying one or more sequences of one or more instructions to the processor 404 for execution. For example, the instructions may initially be borne on a magnetic disk of a remote computer. The remote computer can load the instructions into its dynamic memory and send the instructions over a telephone line using a modem. A modem local to the market analysis system 136 can receive the data on the telephone line and use an infrared transmitter to convert the data to an infrared signal. An infrared detector coupled to the bus 402 can receive the data carried in the infrared signal and place the data on the bus 402. The bus 402 carries the data to the main memory 406, from which the processor 404 retrieves and executes the instructions. The instructions received by the main memory 406 may optionally be stored on the storage device 410 either before or after execution by the processor 404.

The market analysis system 136 may also include a communication interface 418 coupled to the bus 402. The communication interface 418 typically provides a two way data communication coupling between the market analysis system 136 and the network 106. For example, the communication interface 418 may be an integrated services digital network (ISDN) card or a modem used to provide a data communication connection to a corresponding type of telephone line. As another example, the communication interface 418 may be a local area network (LAN) card used to provide a data communication connection to a compatible LAN. Wireless links may also be implemented. Regardless of the specific implementation, the main function of the communication interface 418 is to send and receive electrical, electromagnetic, optical, or other signals that carry digital data streams representing various types of information.

In accordance with the disclosed embodiments, a market analysis application 420, or rather the computer-readable instructions therefor, may reside on the storage device 410. The market analysis application 420 may then be executed by the market analysis system 136 to provide market performance analysis reports to the user 138. Such a market analysis application 420 may be implemented using any suitable programming or scripting language known to those having ordinary skill in the art, include Java, C++, Visual Basic, and the like. In one implementation, the market analysis application 420 may be a Web-based application that the user 138 may access via any suitable Web browser running on his/her personal computer. The user 138 may then access the market analysis application 420 to generate various market performance analysis reports on an ad-hoc basis as needed. All of the foregoing may be accomplished by the user 138 without requiring him/her to possess any particular training or experience in database operation or programming.

Figure 5:
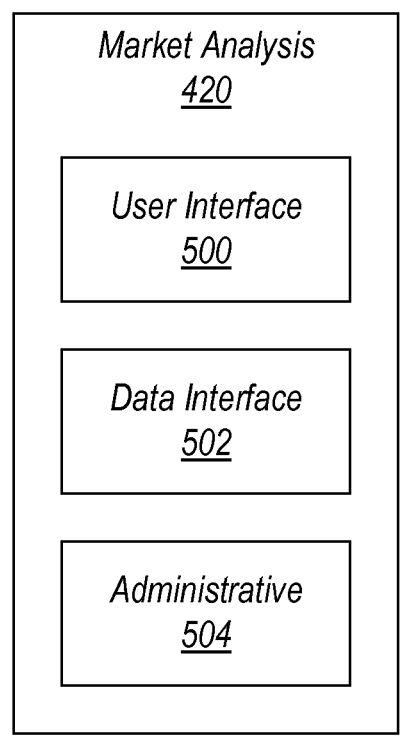
FIG. 5 illustrates an exemplary application configured to provide market performance analysis reports according to the disclosed embodiments.

Referring to now FIG. 5, in one embodiment, the market analysis application 420 comprises a number of functional components, including a user interface module 500, a data interface module 502, and an administrative module 504. One or more of these functional components 500-504 may communicate with one or more other ones of these functional components 500-504 to allow the user 138 to generate a market performance analysis reports. Note that although the functional components 500-504 have been shown as discrete units in FIG. 5, those having ordinary skill in the art will understand that two or more of these components may be combined into a single component, and that an individual component may be divided into several constituent components, without departing from the disclosed embodiments.

In general, the user interface module 500 is responsible for facilitating interaction between the user 138 and the market analysis application 420. To this end, in one embodiment, when the user 138 connects to the market analysis system 136, the user interface module 500 may present a graphical user interface (described later herein with respect to FIG. 6) to the user 138. The graphical user interface allows the user 138 to access the perspectives 120-134 in a graphical and intuitive manner without requiring the user 138 to have any specific programming skills. Any graphical user interfaces may be used without departing from the scope of the disclosed embodiments, provided the interface provides the functionality specified herein.

The data interface module 502 is responsible for the behind-the-scenes connection to the perspectives 120-134 otherwise not visible to the user 138. Thus, for example, the data interface module 502 may ensure that the data can freely flow between the data cubes 108-116 and the perspectives 120-134 corresponding thereto (and hence the user). To this end, the data interface module 502 may implement one or more suitable data transfer protocols known to those having ordinary skill in the art. The data interface module 502 may also simply use the same or a similar protocol provided by any operating system that may be running on the market analysis system 136.

As for the administrative module 504, this module is responsible for various administrative functions related to the use of the market analysis application 420. For example, the administrative module 504 may monitor and provide the status of the data mart 104 and/or the various data cubes 108-116. The administrative module 504 may also track which users are using the market analysis application 420 and/or to what extent the market analysis application 420 is being used. The administrative module 504 may further facilitate capture and storage of any comments or feedback from the users, for example, via a knowledge exchange or database.

Figure 6:
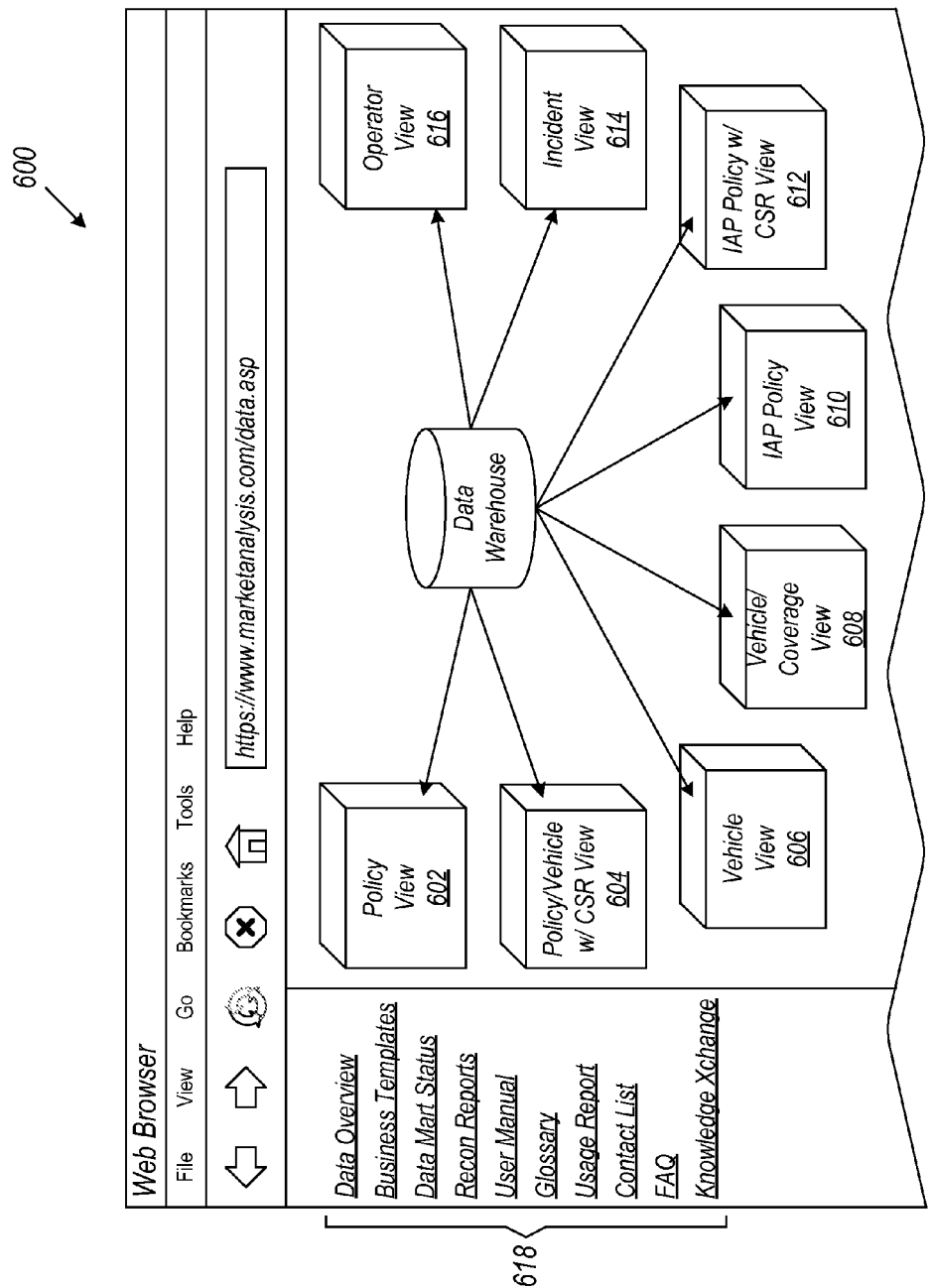
FIG. 6 illustrates an exemplary Web page for providing market performance analysis reports according to the disclosed embodiments.
Figure 7:
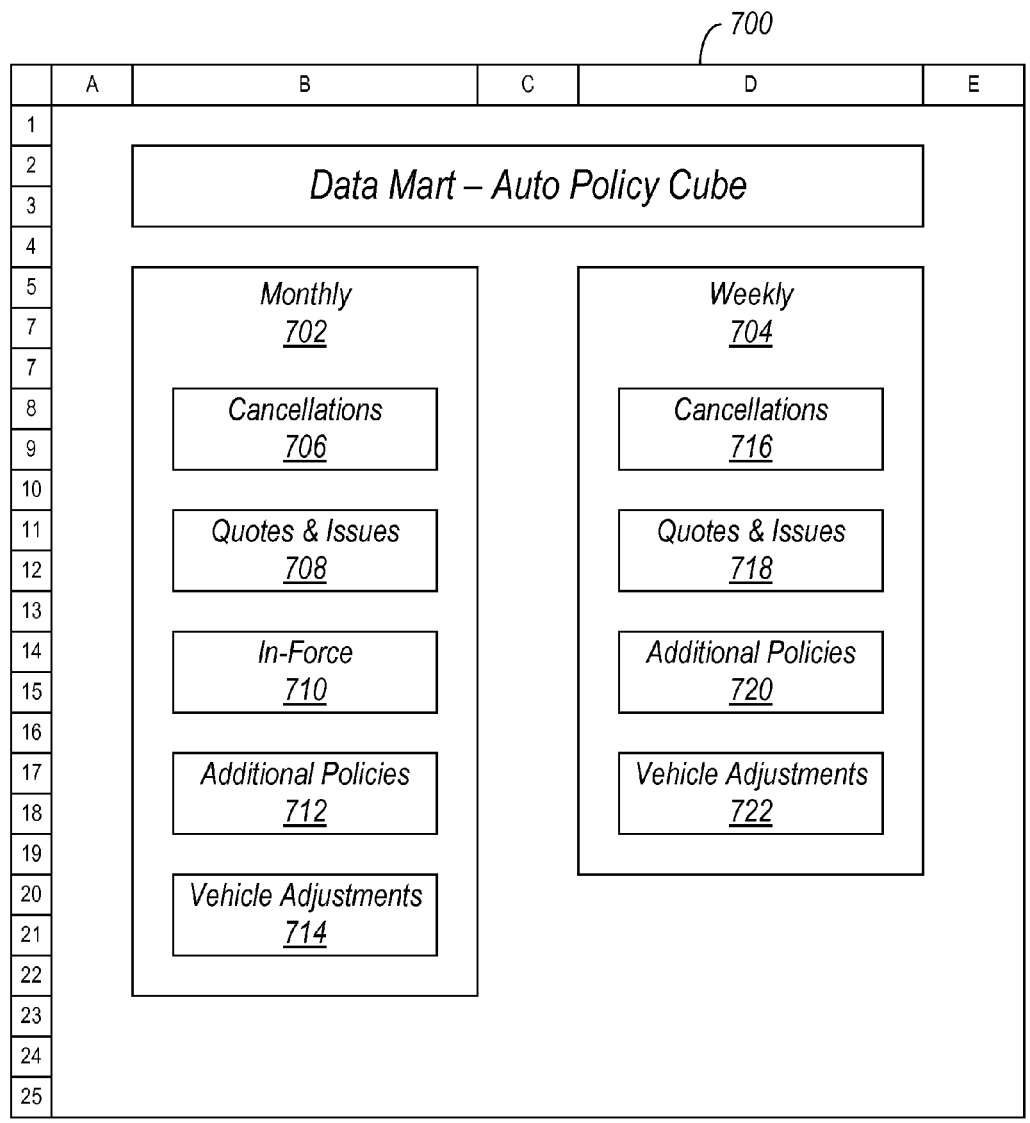
FIG. 7 illustrates an exemplary report selection screen for providing market performance analysis reports according to the disclosed embodiments.
Figure 8:
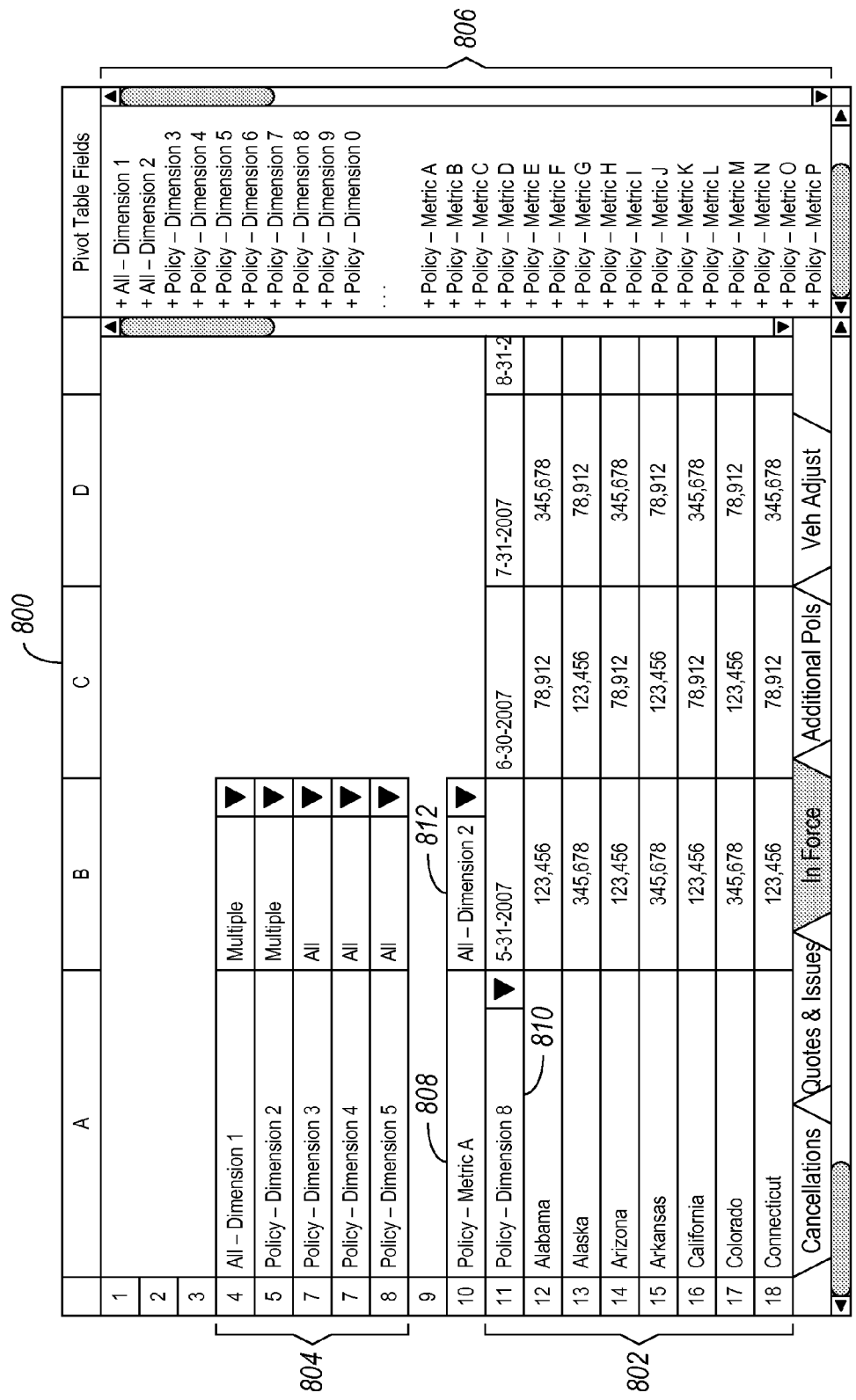
FIG. 8 illustrates an exemplary market performance analysis report according to the disclosed embodiments.

FIGS. 6-8 illustrate an exemplary implementation of the functional modules 500-504 of the market analysis application 420. Referring first to FIG. 6, an exemplary graphical user interface 600 for allowing the user 138 to access the various perspectives 120-134 according to the disclosed embodiments is shown. The graphical user interface 600 here is a Web-based interface, but other presentation protocols may certainly be used without departing from the disclosed embodiments. In this particular implementation, the graphical user interface 600 uses a plurality of views to access the perspectives of 120-134, each view revealing a collection of report templates (described later with respect to FIG. 7) when selected by the user 138. Thus, there may be a policy view 602, a policy/vehicle with CSR viewed 604, a vehicle viewed 606, and a vehicle coverage view 608. There may also be an improved auto pricing (IAP) policy view 610, an improved IAP policy with CSR viewed 612, and incident view 614, and an operator view 616. It should be noted that the exemplary views 600-616 shown here are named more so for the collection of report templates they represent than any correlation to the perspectives 120-134, although it is possible for one or more of the views 600-616 to correspond to one or more of the perspectives 120-134.

In addition to the different views 600-616, the graphical user interface 600 may also present the user 138 with a plurality of instructive and/or administrative options, indicated generally at 618. These options 618 may include, for example, an overview of the data that may be accessed, a listing of available templates, status of the data mart 104, recon reports, a user manual, and a glossary. The options 618 may further include a usage report that shows which users and/or the degree of usage the users are making of the market analysis application 420, a contacts list for contacting technical support, an FAQ, and a knowledge exchange for facilitating capture and storage of comments and feedback from the users.

Selecting one of the views 600-616 takes the user 138 to a template screen showing the collection of report templates related to that view. FIG. 7 illustrates an example of a template screen 700 for the policy view 602, implemented using a spreadsheet program, such as Microsoft Excel. Other views 600-616 may produce a similar template screen when selected and are therefore not described herein. In the embodiment shown here, the template screen 700 may include a set of monthly report template options 702 and a set of weekly report template options 704. The monthly template options 702 may be optimized for running reports based on monthly data and may include, for example, policy cancellations 706, policies quoted and issued 708, policies currently in force 710, additional policies generated during the month 712, and vehicle adjustments (i.e., claims made) 714. Similarly, the weekly template options 704 may be optimized for running reports based on weekly data and may include templates options 716-722 corresponding to the monthly templates options 706-714 except for the policies in force template option 710.

Selecting one of the templates options 716-722 or 706-714 takes the user 138 to a report template for the particular template option selected. FIG. 8 illustrates an example of a report template 800 for the monthly in force template option 710, implemented again using a spreadsheet program, such as Microsoft Excel. As can be seen, the report template 800 may include a pivot table 802, a list of filters 804, and a list of pivot table fields 806. These filters 804 and pivot table fields 806 are provided primarily for the convenience of the user in dragging and dropping and may be based on, or may correspond to, the various dimensions and metrics in the data cubes 108-116 described above with respect to FIG. 1. Examples of filters 804 that may be displayed include dimensions such as effective period, location, eligibility, vehicle type, and the like. Examples of pivot table fields 806 that may be displayed include dimensions such as policy change reason, coverage limit, credit score, and the like, as well as metrics such as number of policies quoted, number of policies issued, member of policies canceled, and the like.

In the pivot table fields, some of the dimensions and metrics are available in all perspectives 120-134 (FIG. 1) and are designated with "All," while others are available only in the policy perspective 124 (which was selected here) and are designated with "policy." In addition, some of the fields in the list of pivot table fields 806 may be contain one or more sub-elements. Expanding a field 806 displays the one or more sub-elements for that field for purposes of dragging and dropping into the pivot table 802. In a similar manner, some of the dimensions in the filter area 804 may have sub-elements that are accessible via drop-down menus adjacent the dimensions. The drop-down menus allow the user 138 to filter on all of the sub-elements (indicated by "All"), multiple sub-elements (indicated by Multiple"), or only a particular sub-element.

In the example shown here, the pivot table 802 is centered on a policy metric, namely Metric A (indicated at 808), relating to the number of policies in force. This particular metric was already predefined for this particular report template 800 as a convenience for the user 138, although it may be modified or replaced by the user 138 as needed. Other report templates may be predefined with other metrics and may be available via various tabs across the bottom of the spreadsheet. Here, the user 138 has opted to filter the data for this metric using a location dimension 810, namely Dimension 8 (e.g., states), and a time dimension 812, namely Dimension 2 (e.g., end of month). The pivot table 802 may then pull all data pertaining to Metric A and filter the data according to Dimensions 8 and 2. The resulting data is displayed in the area to the right of Dimension 8 and underneath Dimension 2 in the manner known to those having ordinary skill in the art. The user 138 may then modify the pivot table 802 to display data pertaining to some other metric and/or filtered according to some other dimension by simply dragging the desired pivot table field 806 into the pivot table 802. The user 138 may also view several levels of data in the same pivot table view. For instance, with the policy/vehicle/coverage data cube 112 (FIG. 1), the user can begin analysis at the policy level (looking at location, company, tier, etc.), then bring in vehicle level dimensions, such as vehicle type and territory, and then also bring in coverage level data, such as coverages, limits and coverage options, and the like. All of this can occur near simultaneously in a single pivot table view of the data. Such an arrangement allows the user 138 to quickly and easily generate virtually any market performance analysis report without having to employ specific programming skills or rely on an IT professional.

Figure 9:
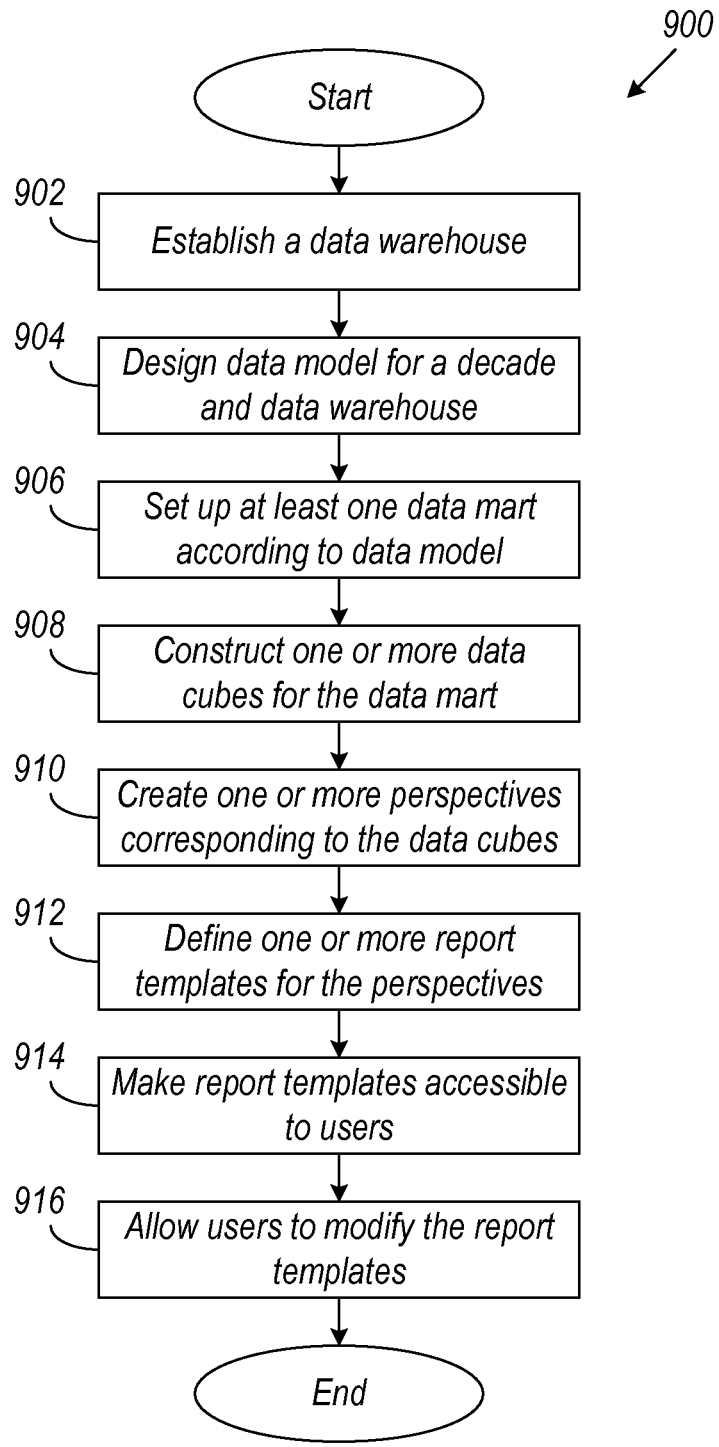
FIG. 9 illustrates an exemplary method of providing market performance analysis reports according to the disclosed embodiments.

Thus far, specific embodiments have been disclosed for providing quotes on multiple types of insurance policies concurrently. Referring now to FIG. 9, general guidelines are shown in the form of a method 900 that may be used to implement the various embodiments disclosed above. As can be seen, the method 900 begins at block 902, where a data warehouse is established for staging data from which market performance analysis reports may be generated. At block 904, a data model is designed for a data mart that specifies the particular data to be stored in the data mart and in which particular configuration. At block 906, a data mart is set up using the data model designed in the immediately preceding block.

At block 908, one or more data cubes is constructed from the data in the data mart, and at block 910 one or more perspectives is constructed from the data cubes consistent with current OLAP technology. One or more report templates may then be defined based on the perspectives at block 912 and made available to users at block 914 for generating market performance analysis reports. At block 916, the users are allowed to modify the report templates as needed to generate specialized and customized market performance analysis reports as needed. The users may thereafter use the market performance analysis reports to make highly accurate projections and decisions with respect to the design and pricing of new and/or existing auto insurance products.

While the disclosed embodiments have been described with reference to one or more particular implementations, those skilled in the art will recognize that many changes may be made thereto. Therefore, each of the foregoing embodiments and obvious variations thereof is contemplated as falling within the spirit and scope of the disclosed embodiments, which are set forth in the following claims.

What is claimed is:

1. A system for accessing market performance analysis in an insurance data mart in a computer network to analyze competitive effectiveness for one or more segments of a business, the system comprising:
a non-transitory computer readable medium having computer-readable instructions stored thereon for execution by a number of processors in a number of computing apparatuses in the computer network, the instructions including;
analyzing the market performance analysis data in the insurance data mart across a plurality of business metrics in order to measure the competitive effectiveness of one or more segments of the business;
constructing one or more perspectives associated with the data mart, wherein each of the one or more perspectives is associated with one of the plurality of business metrics;
organizing the data in the data mart into data cubes according to one or more dimensions, wherein a data cube includes data aggregated into arrays containing data associated with the one or more dimensions;
graphically presenting a plurality of views of data in at least one of the data cubes to the user, each view corresponds to at least one perspective associated with the data mart;
revealing a collection of report templates to the user upon selection by the user of one of the plurality of views, each collection of report templates being related to the perspective selected by the user, wherein the perspective prevents users from selecting invalid combinations of metrics and the one or more dimensions; and
generating a market performance analysis report for the user using at least one report template selected by the user from the collection of report templates that integrates and correlates the plurality of views, as selected by the user from the collection of report templates, for graphical presentation to the user;
wherein the plurality of views includes a policy view and at least one of the following integrated and correlated with the policy view: a vehicle view and an operator view, wherein the policy view includes market performance analysis data associated with a number of insurance policies, the vehicle view includes market performance analysis data associated with a number of vehicles insured by the number of insurance policies and the operator view includes market performance analysis data associated with a number of operators insured by the number of policies.

2. The system of claim 1, wherein the plurality of views further include one or more of the following integrated and correlated with the policy view: a coverage view, and incident view, and an improved auto pricing view.

3. The system of claim 1, wherein the market performance analysis report is generated "on the fly" using the at least one report template from the collection of report templates.

4. The system of claim 1, wherein presenting, revealing, and generating are performed by functional components of a centralized market analysis application.

5. The system of claim 4, the non-transitory computer readable medium further including instructions for tracking a usage of the market analysis application.

6. The system of claim 4, the non-transitory computer readable medium further including instructions for capturing and storing feedback from the user regarding the market analysis application.

7. The system of claim 4, wherein the market analysis application is a Web-based application.

8. A method for accessing market performance analysis data in an insurance data mart in a computer network to analyze competitive effectiveness for one or more segments of business, the method comprising:
using a non-transitory computer readable medium having computer-readable instructions stored thereon for execution by a number of processors in a number of computing apparatuses in the computer network for;

analyzing the market performance analysis data in the insurance data mart across a plurality of business metrics in order to measure the competitive effectiveness of the one or more segments of the business;

constructing one or more perspectives associated with the data mart, wherein each of the one or more perspectives is associated with one of the plurality of business metrics;

organizing the data in the data mart into data cubes according to one or more dimensions, wherein a data cube includes data aggregated into arrays containing data associated with the one or more dimensions;

graphically presenting a plurality of views of data in at least one of the data cubes to the user, each view corresponding to at least one perspective associated with the data mart;

revealing a collection of report templates to the user upon selection by the user of one of the plurality of views, each collection of report templates being related to the perspective selected by the user, wherein the perspective prevents users from selecting invalid combinations of metrics and the one or more dimensions; and generating a market performance analysis report for the user using at least one report template selected by the user from the collection of report templates that integrates and correlates the plurality of views, as selected by the user from the collection of report templates, for graphical presentation to the user;

wherein the plurality of views includes a policy view and at least one of the following integrated and correlated with the policy view: a vehicle view, and an operator view, wherein the policy view includes market performance analysis data associated with a number of insurance policies, the vehicle view includes market performance analysis data associated with a number of vehicles insured by the number of insurance policies and the operator view includes market performance analysis data associated with a number of operators insured by the number of policies.

9. The method of claim 8, wherein the plurality of views further include one or more of the following integrated and correlated with the policy view: a coverage view, and incident view, and an improved auto pricing view.

10. The method of claim 8, wherein the market performance analysis report is generated "on the fly" using the at least one report template from the collection of report templates.

11. The method of claim 8, wherein the presenting, revealing, and generating are performed by functional components of a centralized market analysis application.

12. The method of claim 11, further comprising tracking a usage of the market analysis application.

13. The method of claim 11, further comprising capturing and storing feedback from the user regarding the market analysis application.

14. The method of claim 11, wherein the market analysis application is a Web-based application.

15. A non-transitory computer readable medium having computer-readable instructions for accessing market performance analysis data in an insurance data mart in a computer network to analyze the effectiveness for one or more segments of a business, the instructions comprising:

a non-transitory computer readable medium having computer-readable instructions stored thereon for execution by a number of processors in a number of computing apparatuses in the computer network to;

analyze the market performance analysis data in the insurance data mart across a plurality of business metrics in order to measure the competitive effectiveness of one or more segments of the business;

create one or more perspectives associated with the data mart, wherein each of the one or more perspectives is associated with one of the plurality of metrics;

organize the data in the data mart into data cubes according to one or more dimensions, wherein a data cube includes data aggregated into arrays containing data associated with the one or more dimensions;

graphically present a plurality of views of data in at least one of the data cubes to the user, each view corresponds to at least one perspective associated with the data mart;

reveal a collection of report templates to the user upon selection by the user of one of the plurality of views, each collection of report templates being related to the perspective selected by the user, wherein the perspective prevents users from selecting invalid combinations of metrics and the one or more dimensions; and generate a market performance analysis report for the user using at least one report template selected by the user from the collection of report templates that integrates and correlates the plurality of views, as selected by the user from the collection of report templates, for graphical presentation to the user;

wherein the plurality of views includes a policy view and at least one of the following integrated and correlated with the policy view: a vehicle view, and an operator view, wherein the policy view includes market performance analysis data associated with a number of insurance policies, the vehicle view includes market performance analysis data associated with a number of vehicles insured by the number of insurance policies and the operator view includes market performance analysis data associated with a number of operators insured by the number of policies.

16. The computer-readable medium of claim 15, wherein the plurality of views further include one or more of the following integrated and correlated with the policy view: a coverage view, and incident view, and an improved auto pricing view.

17. The computer-readable medium of claim 15, wherein the market performance analysis report is generated "on the fly" using the at least one report template from the collection of report templates.

18. The computer-readable medium of claim 15, wherein the presenting, revealing, and generating are performed by functional components of a centralized market analysis application.

19. The computer-readable medium of claim 18, further comprising instructions for causing a computer to track a usage of the market analysis application.

20. The computer-readable medium of claim 18, further comprising instructions for causing a computer to capture and store feedback from the user regard the market analysis application.

21. The computer-readable medium of claim 18, wherein the market analysis application is a Web-based application.

* * * * *